United States Patent [19]

Reuben

[11] Patent Number: 4,751,764
[45] Date of Patent: Jun. 21, 1988

[54] FLOOR MAT ANCHOR
[75] Inventor: Harold Reuben, Akron, Ohio
[73] Assignee: The Akro Corporation, Canton, Ohio
[21] Appl. No.: 767,030
[22] Filed: Aug. 19, 1985
[51] Int. Cl.⁴ ............................................. A47G 27/04
[52] U.S. Cl. ............................................... 16/8; 16/4; 296/1 F
[58] Field of Search ................. 16/8, 1 R, 4; D12/203; 296/1 F; 428/95, 99; 15/215, 216

[56] References Cited

U.S. PATENT DOCUMENTS

| | | | |
|---|---|---|---|
| 751,738 | 2/1904 | Kingston | 16/1 |
| 1,896,873 | 2/1933 | Upham | 16/8 |
| 3,452,497 | 7/1969 | Warp | 16/1 |
| 3,823,058 | 7/1974 | Yamaguchi | 296/1 F |
| 4,340,633 | 7/1982 | Robbins, Jr. | 428/99 |
| 4,481,240 | 11/1984 | Roth | 296/1 F |
| 4,504,537 | 3/1985 | Mussallem, Jr. | 428/95 |
| 4,588,628 | 5/1986 | Roth | 296/1 F |

Primary Examiner—Paul A. Bell
Assistant Examiner—James L. Wolfe
Attorney, Agent, or Firm—Bell, Seltzer, Park & Gibson

[57] ABSTRACT

An anchor for use in vehicles to prevent movement of a floor mat relative to a floor covering in which the floor covering is partly noncarpeted. In one preferred embodiment the anchor has two sections and is disposed between a floor mat and a floor covering. The first section has upwardly extending projections for engaging the bottom of the floor mat and downwardly extending projections for engaging the carpet area of the floor covering. The second section has at least one smooth major surface and is made from a material having a high coefficient of friction. The smooth major surface abuttingly engages the noncarpet area of the floor covering. A second major surface which is located in the second section opposite the smooth side engages the bottom of the floor mat.

13 Claims, 3 Drawing Sheets

FLOOR MAT ANCHOR

BACKGROUND OF THE INVENTION

This invention relates to vehicle floor mats, and particularly to an improved anchor for preventing relative movement between a floor mat and a vehicle floor covering.

Many vehicle floor coverings have a large carpet area and a smaller wear and dirt resistant noncarpet area. This noncarpet area is located where an operator's feet would normally be positioned during the operation of the vehicle. Such is commonly referred to as a heel pad. The noncarpet area is often made from a relatively stiff elastomer and tends to have an upper surface which may be slippery. In an attempt to protect the vehicle floor covering, a protective floor mat is sometimes placed over the floor covering where the operator's feet would normally be positioned.

These floor mats can be carpeted on both sides so they can be flipped over or reversed. A floor mat which is carpeted on both sides tends to slide relative to a floor covering. This presents a bothersome and possibly dangerous condition.

In an attempt to solve the problem, it has been suggested that an anchor with rigid projections extending outwardly from its major side surfaces be pivotally connected to the floor mat. The anchor is placed between the floor mat and a vehicle floor covering. The projections from the upper side of the anchor engage the floor mat and the projections from the lower side of the anchor engage the carpet area of the floor covering. When the floor mat is flipped over, the anchor is pivoted about its connection with the floor mat. This results in the anchor being properly positioned with the now downwardly turned side of the floor mat.

Stiff projections on this known anchor may contact the noncarpet area of the floor covering. Since the noncapet area is formed of a relatively stiff elastomer, the projections from the bottom of the anchor cannot extend into the noncarpet area. Therefore, only the tips of the projections engage the noncarpet area. This limited engagement promotes movement of the floor mat relative to the carpet area. If the anchor is constructed so as not to engage the noncarpet area, then the floor mat may move because of the location of the anchor relative to the floor mat permits a portion of the floor mat to have no anchoring device in contact therewith.

SUMMARY OF THE INVENTION

The present invention provides an improved anchor for preventing relative movement between a floor mat and a vehicle floor covering. The anchor has a toothed section for engaging a carpet area of the floor covering and a smooth relatively soft section having a high coefficient of friction for abuttingly engaging a noncarpet area of the floor covering. The anchor can be pivotally attached to the floor mat so the floor mat and the anchor can be flipped over or reversed when desired.

BRIEF DESCRIPTION OF THE DRAWINGS

The foregoing and other objects and advantages of the present invention will become apparent to those skilled in the art to which the invention applies upon a consideration of the following description taken in conjunction with the accompanying drawings wherein.

DESCRIPTION OF ONE SPECIFIC PREFERRED EMBODIMENT

Figure 1:
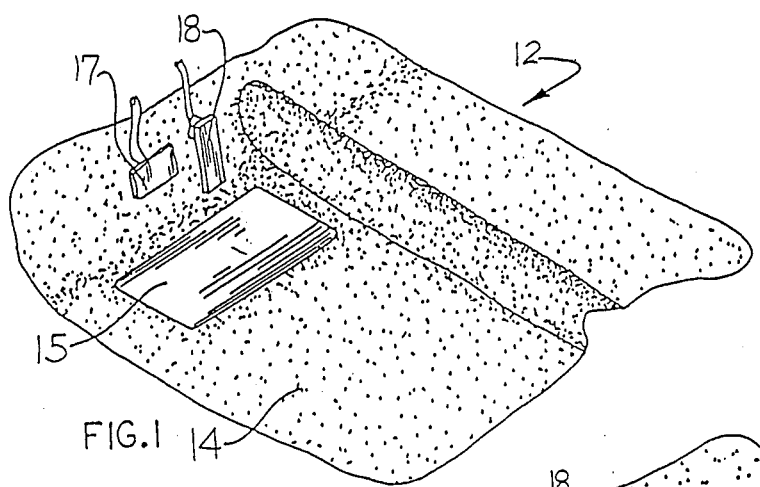
FIG. 1 is a perspective view showing a vehicle floor covering having a large carpet area and a smaller noncarpet area.

A vehicle floor covering 12 (FIG. 1) has a relatively large carpet area 14 and a relatively small noncarpet area 15. The noncarpet area 15 is made of a smooth rubber-like material or elastomer. The noncarpet area 15 is located adjacent to the brake pedal 17 and the accelerator pedal 18 of the vehicle. The noncarpet area 15 provides a dirt and wear resistant surface on which an operator's heels would normally be positioned during the vehicle's operation.

The portion of the floor covering adjacent to the pedals 17 and 18 and the driver's seat (not shown) is subject to the greatest amount of dirt and wear. Because of this, it is often desirable to place a floor mat 22 (FIG. 2) over the floor covering 12 in this area.

In order to maximize the useful life of the floor mat 22, the floor mat has carpet on both sides. This enables the floor mat 22 to be flipped over or reversed to expose the opposite carpet surface of the floor mat. The previously unexposed carpet surface of the floor mat 22 now becomes exposed to the operator's heels and the accompanying dirt and wear.

If the floor mat 22 is not somehow anchored to the floor covering 12, the floor mat tends to slip relative to the vehicle floor covering. An anchor 25 prevents movement of the floor mat 22 relative to the floor covering 12. The anchor 25 is disposed between the floor mat 22 and the floor covering 12. In accordance with a feature of the present invention, the anchor 25 prevents movement between the floor mat 22 and both the carpet 14 (FIG. 1) and noncarpet 15 areas of the floor covering 12.

Figure 2:
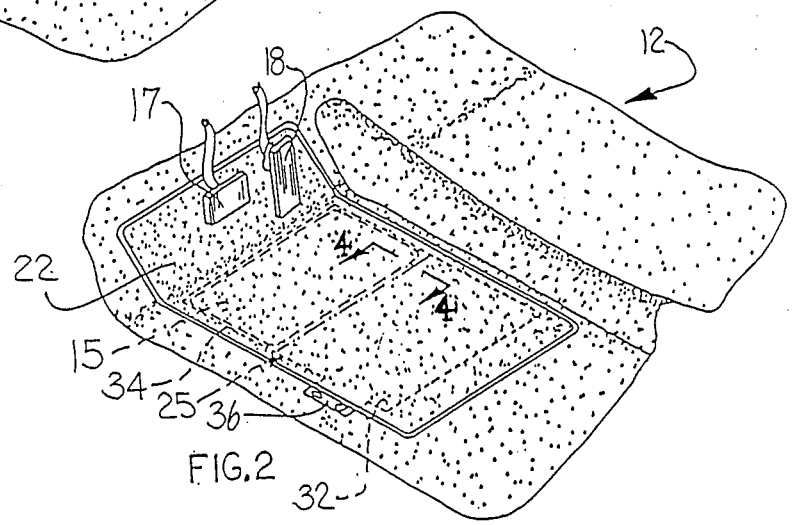
FIG. 2 is a perspective view illustrating a floor mat over the floor covering of FIG. 1, the floor mat being held in place by an anchor constructed in accordance with the present invention.

The anchor 25 (FIG. 3) has two sections 32 and 34 which are connected together. A toothed first section 32 becomes enmeshed in both a bottom carpet surface of the floor mat 22 (FIG. 2) and a carpet area 14 (FIG. 1) of the floor covering 12. A smooth major side surface of a second section 34 (FIG. 3) abuttingly engages a noncarpet area 15 (FIG. 1) of the floor covering 12. A second major side surface of the second sections 34 engages a bottom carpet surface of the floor mat 22 (FIG. 2).

The anchor 25 can be pivotally attached to the floor mat 22. This allows the floor mat 22 and the anchor 25 to be flipped over or reversed. The pivotal attachment also retains the proper position of the second section 34 (FIG. 3) of the floor mat 22 (FIG. 2) relative to a noncarpet area 15 (FIG. 1) of the floor covering 12 when the mat and anchor are flipped over.

A rectangular first section 32 (FIG. 3) of the anchor 25 prevents relative movement between a floor mat 22 (FIG. 2) and the carpet area 14 (FIG. 1) of the floor covering 12. The anchor 25 (FIG. 3) has a plurality of generally conical projections 42 (FIG. 4) which extend upwardly from a base sheet 40. The projections 42 become enmeshed in a bottom carpet side 45 of the floor mat. The anchor 25 also has a plurality of generally conical projections 41 which extend downwardly from the base sheet 40. The projections 41, 42 extend in opposite directions from the base sheet 40 for a distance greater than the thickness of the base sheet. The projections 41 become enmeshed in a carpet area 14 of the floor covering.

The base sheet 40 and projections 41 and 42 are preferably molded as one piece of elastomeric material having a durometer reading of approximately 80-100. This permits the projections 41 and 42 to become easily impaled in carpet areas 14 and 45 and secures the anchor to these carpet areas. In a specific instance, the material of the base sheet 40 and projections 41 and 42 was a hard rubber having a 95 durometer reading.

Figure 3:
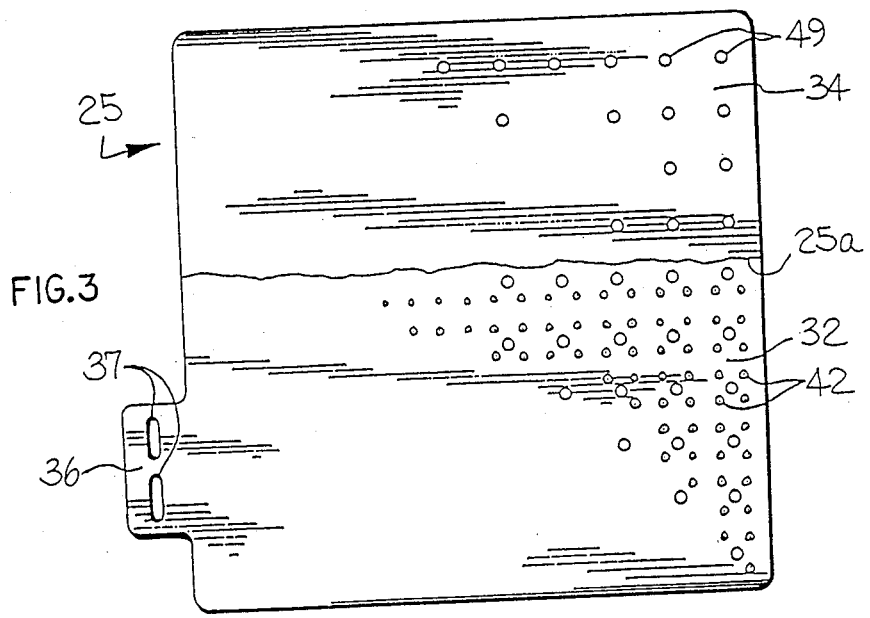
FIG. 3 is a plan view of the anchor.
Figure 4:
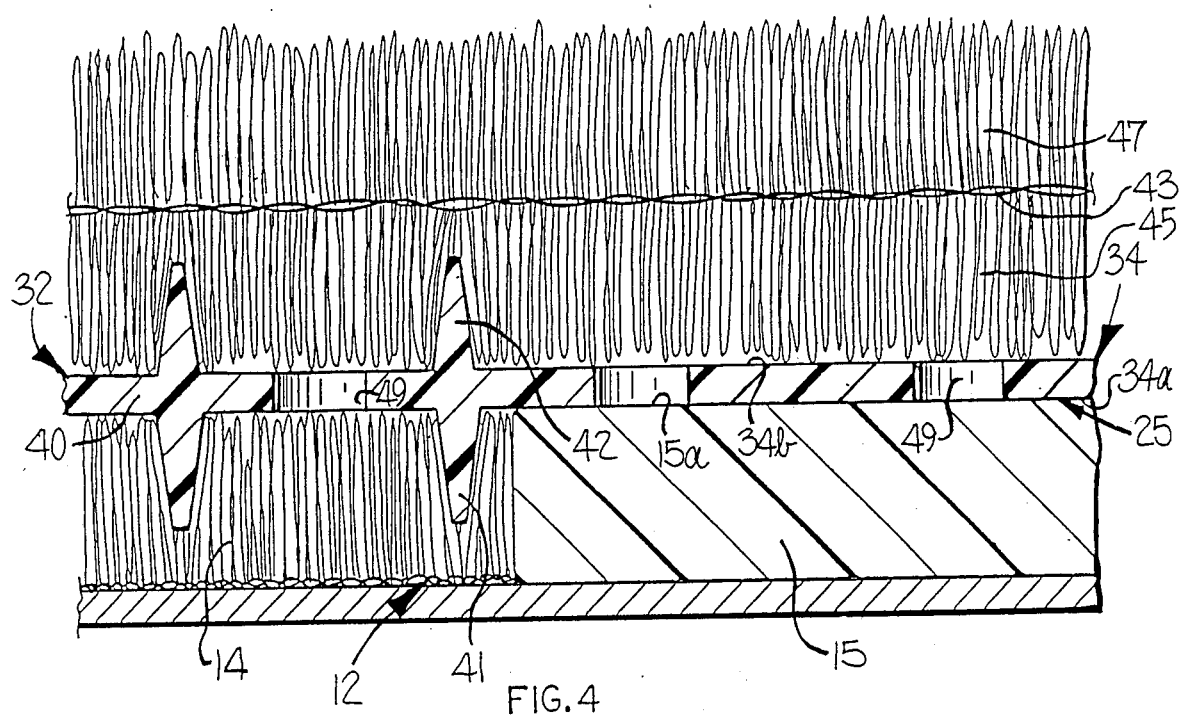
FIG. 4 is an enlarged fragmented cross-sectional view taken along line 4—4 of FIG. 2 illustrating the construction of the anchor and the manner in which the anchor cooperates with carpet and noncarpet areas of the vehicle floor covering.

The second section 34 (FIG. 3) of the anchor, because of a sticky characteristic, prevents relative movement between a floor mat 22 (FIG. 2) and a noncarpet area 15 (FIG. 1) of the floor covering 12. The second section 34 (FIG. 3) of the anchor 25 is a continuation of the base sheet 40. Both the second section 34 and the first section base sheet 40 are approximately the same thickness. The second section 34 of the anchor 25 has a projection-free downwardly facing major side surface 34a which is a continuation of a major side surface of the base sheet 40 (FIG. 4). The smooth major side 34a of the second section 34 abuttingly engages a smooth upwardly facing side surface 15a (FIG. 4) of the noncarpet area 15 of the floor covering. The second section 34 is flexible enough to conform to the contours of the noncarpet area 15 of the floor covering to maximize the contact therebetween. The second section 34 has major side surfaces large enough to cover the noncarpet area 15 of the floor covering.

The second section 34 also has an upwardly facing major side surface 34b. In the illustrated embodiment of the invention, as best shown in FIGS. 3 and 4, the upwardly facing major side surface 34b is flat and free of projections. The upper side surface 34b abuttingly engages the bottom surface of the floor mat 22. The sticky characteristic of the second section 34b also engages a bottom portion of the floor mat 45 to prevent relative movement. For example, the engagement between the second section 34b and a bottom portion of the floor mat 45 is sufficient to overcome a force applied at a 45 degree angle to the engaged surfaces.

Figure 7:
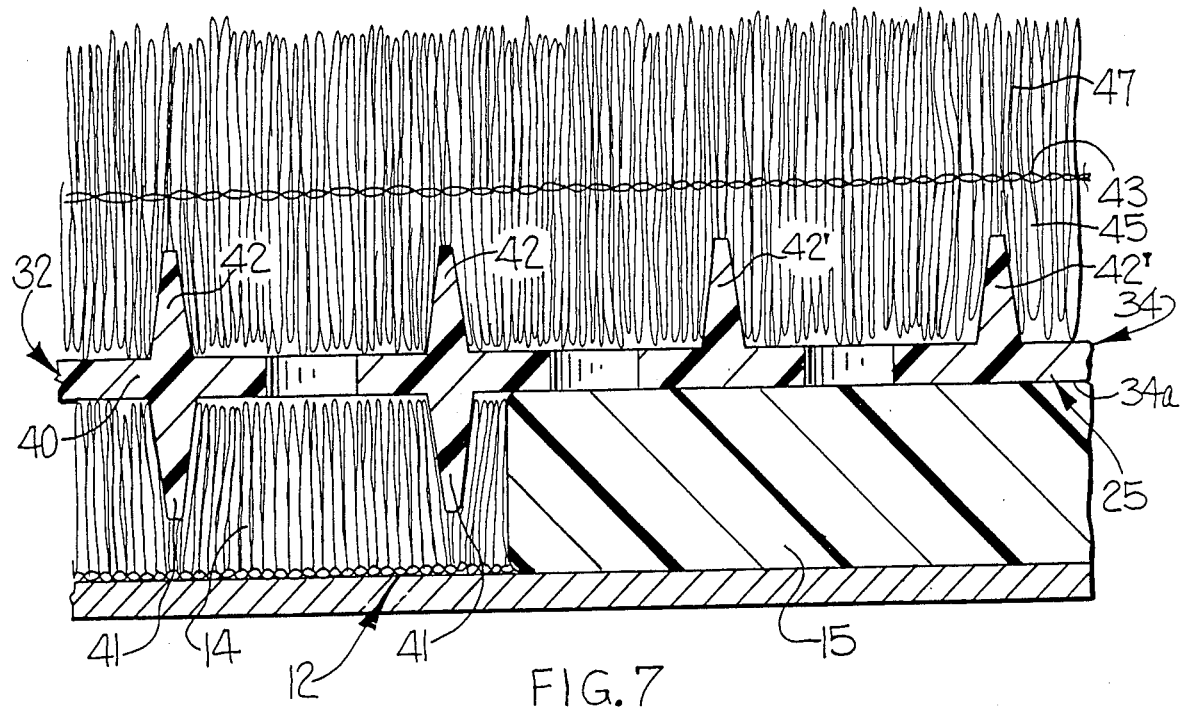
FIG. 7 is an enlarged fragmented cross-sectioned view similar to FIG. 4 and illustrating the addition of projections extending upwardly from the upper surface of the second section.

Although the upper side 34b of the section 34 has been shown as being free of projections in FIGS. 3 and 4, projections 42 similar to the projections 41 and 42 may be provided if desired as shown in FIG. 7. This may be particularly advantageous when the anchor 25 is not pivotally connected to the floor mat 22.

The second section 34 is made from an elastomeric material with a coefficient of friction of approximately 0.85-0.95 between the second section and the noncarpet area 15 of the floor covering. It is the high coefficeicnt of friction or stickiness between the smooth major side surfaces of the second section 34 and a noncarpet area 15 of the floor covering and between a floor mat bottom 45 that provides the anchor 25 with maximum movement resistance. The specific composition elastomeric material of section 34 does not form a part of this invention. However, one material which would be effective is a natural rubber material. The elastomeric material of the section 34 has a durometer reading which is less than the durometer reading of the section 32. Thus, the secion 34 could have a durometer reading of 40-60.

The two sections 32 and 34 are formed in a single mold cavity by filling a portion of the mold cavity having a configuration corresponding to the first section 32 with one elastomeric material through a first mold sprue and runner system. A portion of the mold cavity having a configuration corresponding to second the section 34 is filled with a second elastomeric material through a second mold sprue and runner system. The two elastomeric materials meet at and form an irregular interface indicated by the line 25a in FIG. 3.

The anchor 25 (FIG. 2) is pivotally connected to the floor mat 22. The anchor 25 (FIG. 3) has an integrally formed mounting section 36 adjacent to the toothed first sections 32. The mounting slots 37 receive an attaching apparatus which can be fixedly connected to the floor mat.

Figure 5:
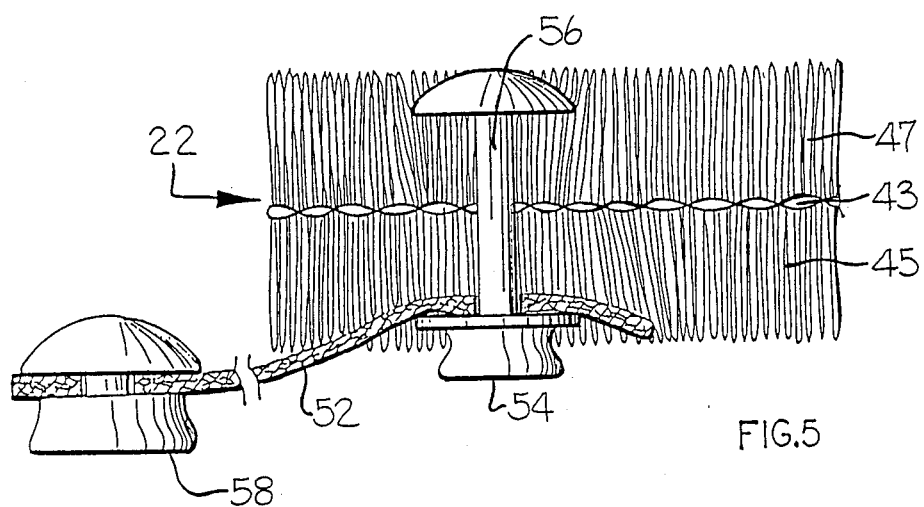
FIG. 5 is a partial cross sectional view illustrating the manner in which a hinge strap for the anchor is fastened to a floor mat.
Figure 6:
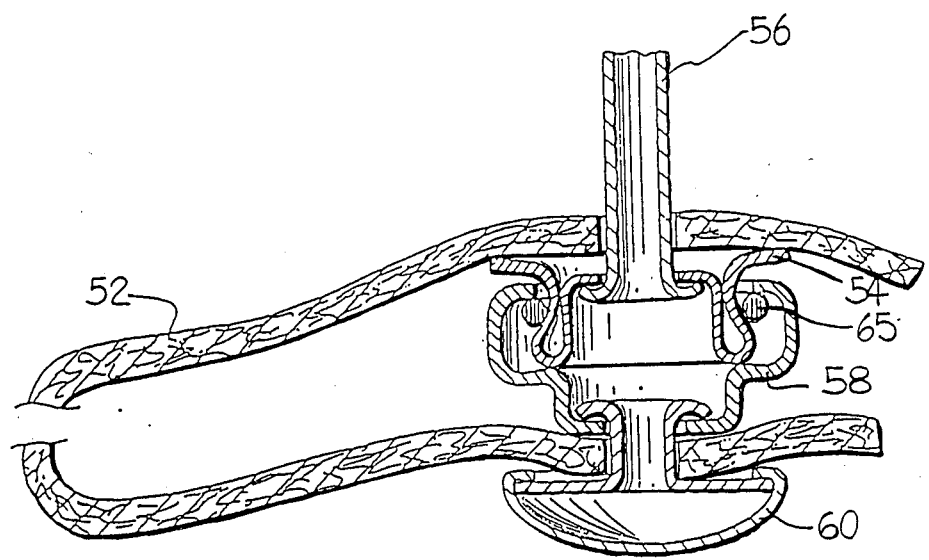
FIG. 6 is an enlarged cross-sectional view of an engaged snap fastener used to attach the anchor to a floor mat.

One such attaching apparatus is a hinge strap 52 (FIG. 5). The hinge strap 52 is fixedly attached at one end to the floor mat 22 by a snap fastener post 56 being swaged to a snap fastener attaching end 54. The attaching end 54 (FIG. 6) has two different outside diameters exposed, the larger of which is outermost from the floor mat 22 (FIG. 5). A snap fastener receiver 58 (FIG. 6) is fixedly connected to a second end of the hinge strap 52. The receiver 58 has an opening exposed with an inside diameter slightly larger than the larger diameter of the attaching end 54, and a circumferentially expandable slit steel ring 65 retained therein. The steel ring 65 has a free state inside diameter slightly smaller than the larger diameter of the attaching end 54. The hinge strap 52 is looped through the mounting slots 37 (FIG. 3) and then the snap fastener receiving end 58 (FIG. 6) coaxially engages the snap fastener attaching end 54. Upon engagement of the ends 54 and 58, the steel ring 65 is forced to circumferentially expand over the larger diameter of the attaching end and then nest in the smaller diameter portion to prevent disengagement.

The anchor of the present invention preferably has holes 49 extending between the major side surfaces of both sections 32 and 34. This reduces the weight of the mat.

In another embodiment, the present invention contemplates applications in which the anchor 25 (FIG. 2) is not pivotally attached to the floor mat 22.

Thus, the present invention provides an improved anchor 25˙(FIG. 3) for preventing relative movement between a floor mat 22 FIG. 2) and a vehicle floor covering 12. The anchor has a toothed section 32 (FIG. 4) for engaging a carpet area 14 of the floor covering and a smooth section 34 for abuttingly engaging a noncarpet area 15 of the floor covering. The anchor 25 (FIG. 2) can be pivotally attached to the floor mat 22 so the floor mat and the anchor can be flipped over or reversed when desired.

Having described a specific preferred embodiment of the invention, the following is claimed:

1. An anchor for use in holding a double-sided floor mat having carpeted top and bottom sides against movement relative to a floor covering having a carpet area and a noncarpet area, said anchor comprising:

a first section adapted to be disposed between the carpeted bottom side of the floor mat and the carpet area of the floor covering; and a second section adapted to be disposed between the carpeted bottom side of the floor mat and the noncarpet area of the floor covering;

said first and second sections of said anchor including a base sheet which is coextensive with said first and second sections and has upper and lower side surfaces, said first section of said anchor including a first series of projections extending in a first direction from the upper side surface of said base sheet for engaging the bottom of the floor mat and a second series of projections extending in a second opposite direction from the lower side surface of said base sheet for engaging the carpet area of the floor covering to hold the floor mat against movement relative to the carpet area of the floor covering;

said second section of said anchor including a first side surface area disposed on said base sheet and including a series of projections extending in said first direction from the upper side surface of said base sheet for engaging the bottom of the floor mat and a second side surface area disposed on said base sheet for engaging the noncarpet area of the floor covering, said second side surface area being free of projections and abuttingly engaging a surface of the noncarpet area of the floor covering and having a relatively high coefficient of friction therebetween to prevent sliding movement of the second section relative to the noncarpet area of the floor covering.

2. An anchor as set forth in claim 1 wherein said first side surface area is defined by a flexible planar surface.

3. An anchor as set forth in claim 1 wherein said first series of projections extend in the first direction from the upper side surface of said base sheet for a distance which is greater than the thickness of said base sheet and said second series of projections extend in a second opposite direction from the lower side surface of said base sheet for a distance which is greater than the thickness of said base sheet.

4. An anchor as set forth in claim 1 wherein said first section of said anchor is formed of a first material having a durometer of approximately 80-100, said second section of said anchor is formed of a second material having a relatively high coefficient of friction between said anchor and the noncarpet area of the floor covering.

5. An anchor as set forth in claim 4 wherein said first and second sections of said anchor are molded as one piece, said base sheet being flexible to enable said anchor to conform to the contours of the floor covering.

6. An anchor as set forth in claim 1 further including hinge means for pivotally connecting said anchor with the floor mat.

7. An anchor as set forth in claim 6 wherein said hinge means includes at least one flexible strap fixedly attached at a first end portion of the floor mat, said anchor having at least one strap mounting section, said mounting section having at least one opening extending therethrough, a second end of said flexible strap being insertable through said opening, and means for releasably attaching said second end of said strap to the floor mat.

8. An anchor as set forth in claim 7 wherein said means for attaching said second end of said strap to the floor mat includes a snap fastener having an attaching end which fixedly connects the first end of said flexible strap to the floor mat, a receiving end fixedly connected to the second end of said flexible strap, and said receiving end releasably connectable to said attaching end.

9. An apparatus comprising:

a double-sided floor mat having top and bottom carpeted sides;

an anchor for use in holding said floor mat against movement relative to a floor covering having a carpet area and a noncarpet area, said anchor having a first section adapted to be disposed between the bottom carpeted side of the floor mat and the carpet area of the floor covering and a second section adapted to be disposed between the bottom carpeted side of the floor mat and the noncarpet area of the floor covering, said first section of said anchor incuding a first series of projections extending upwardly for engaging the bottom of the floor mat and a second series of projections extending downwardly for engaging the carpet area of the floor covering to prevent movement of said floor mat relative to the carpet area of the floor covering, said second section of said anchor being integrally formed with said first section and having a projection-free first side of a relatively high coefficient of friction between said anchor and the noncarpet area of the floor cover for engaging the noncarpet area of the floor covering to hold the floor mat against movement relative to the noncarpet area of the floor covering said second section having a second side opposing said first side, said second side having a series of projections extending therefrom for engaging the bottom of the floor mat; and hinge means for pivotally connecting said anchor with said floor mat, said hinge means including at least one flexible strap having a first portion connected to said floor mat and a second portion connected to said anchor.

10. An apparatus as set forth in claim 9 wherein said hinge means includes a mounting section attached to said anchor, said mounting section having at least one opening through which said second portion of said strap extends.

11. An apparatus as set forth in claim 10 further including fastener means for releasably attaching said second portion of said strap to said floor mat.

12. An anchor for use in holding a double-sided floor mat having carpeted top and bottom sides against movement relative to a floor covering having a carpet area and a noncarpet area, said anchor comprising:

a first section adapted to be disposed between the carpeted bottom side of the floor mat and the carpet area of the floor covering; and, a second section adapted to be disposed between the carpeted bottom side of the floor mat and the noncarpet area of the floor covering;

said first and second sections of said anchor including a base sheet which is coextensive with said first and second sections and has upper and lower side surfaces, said first section of said anchor including a first series of projections extending in a first direction from the upper side surface of said base sheet for engaging the bottom of the floor mat and a second series of projections extending in a second opposite direction from the lower side surface of said base sheet for engaging the carpet area of the floor covering to hold the floor mat against movement relative to the carpet area of the floor covering;

said second section of said anchor including a first side surface area disposed on said base sheet, said first side surface being free of projections for engaging the bottom of the floor mat and a second side surface area disposed on said base sheet for engaging the noncarpet area of the floor covering, said second side surface area also being free of projections and abuttingly engaging a surface of the noncarpet area of the floor covering and having a relatively high coefficient of friction therebetween to prevent sliding movement of the second section relative to the noncarpet area of the floor covering.

13. An apparatus comprising:

a double-sided floor mat having top and bottom carpeted sides;

an anchor for use in holding said floor mat against movement relative to a floor covering having a carpet area and a noncarpet area, said anchor having a first section adapted to be disposed between the bottom carpeted side of the floor mat and the carpet area of the floor covering and a second section adapted to be disposed between the bottom carpeted side of the floor mat and the noncarpet area of the floor covering, said first section of said anchor including a first series of projections extending upwardly for engaging the bottom of the floor mat and a second series of projections extending downwardly for engaging the carpet area of the floor covering to prevent movement of said floor mat relative to the carpet area of the floor covering, said second section of said anchor being integrally formed with said first section and having a projection-free first side of a relatively high coefficient of friction between said anchor and the noncarpet area of the floor cover for engaging the noncarpet area of the floor covering to hold the floor mat against movement relative to the noncarpet area of the floor covering, said second section having a second side opposing said first side, said second side also being free of projections; and hinge means for pivotally connecting said anchor with said floor mat, said hinge means including at least one flexible strap having a first portion connected to said floor mat and a second portion connected to said anchor.

* * * * *